United States Patent
Sakamoto et al.

(10) Patent No.: US 9,348,109 B2
(45) Date of Patent: May 24, 2016

(54) OPTICAL DEVICE

(71) Applicants: Sintai Optical (Shenzhen) Co., Ltd., Shenzhen, Guandong Province (CN); Asia Optical International Ltd., Tortola (GB)

(72) Inventors: Takamasa Sakamoto, Shenzhen (CN); Chun-Hung Huang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola, Virgin Islands (GB)

( * ) Notice: Subject to any disclaimer, the term of this patent is extended or adjusted under 35 U.S.C. 154(b) by 32 days.

(21) Appl. No.: 14/178,444

(22) Filed: Feb. 12, 2014

(65) Prior Publication Data

US 2014/0327973 A1 Nov. 6, 2014

(30) Foreign Application Priority Data

May 3, 2013 (TW) .............................. 102115852 A

(51) Int. Cl.
*G02B 15/14* (2006.01)
*G02B 7/10* (2006.01)
*H04N 5/225* (2006.01)

(52) U.S. Cl.
CPC .............. *G02B 7/102* (2013.01); *H04N 5/2254* (2013.01)

(58) Field of Classification Search
USPC .................................. 359/694–704, 811–830
See application file for complete search history.

(56) References Cited

U.S. PATENT DOCUMENTS

| 7,302,175 | B2 | 11/2007 | Tsuji | |
|---|---|---|---|---|
| 7,308,195 | B2 * | 12/2007 | Yumiki et al. | ................... 396/75 |
| 2002/0114083 | A1 * | 8/2002 | Cheung | .......................... 359/700 |
| 2008/0013190 | A1 * | 1/2008 | Oshima | .......................... 359/699 |
| 2008/0088946 | A1 * | 4/2008 | Hu | .......................... G02B 7/102 |
| | | | | 359/696 |
| 2010/0165481 | A1 * | 7/2010 | Zou et al. | ...................... 359/700 |

FOREIGN PATENT DOCUMENTS

CN 1702486 A 11/2005
CN 201594155 U 9/2010

OTHER PUBLICATIONS

English Abstract translation of CN201594155 (Published Sep. 29, 2010).

* cited by examiner

*Primary Examiner* — Mohammed Hasan
(74) *Attorney, Agent, or Firm* — McClure, Qualey & Rodack, LLP

(57) ABSTRACT

An optical device includes a first lens frame bearing a first lens set and having a plurality of rods, a first cam barrel rotating to move the first lens frame along a first axis, a second lens frame bearing a second lens set and having a plurality of holes corresponding to the rods, and a second cam barrel rotatably disposed around the first cam barrel to rotate the first cam barrel and move the second lens frame along a second axis parallel to the first axis, wherein the first axis is substantially coincident with the second axis with the rods inserted into the holes.

10 Claims, 4 Drawing Sheets

200

OPTICAL DEVICE

CROSS REFERENCE TO RELATED APPLICATIONS

BACKGROUND OF THE INVENTION

1. Field of the Invention

The invention relates to an optical device, and more particularly to an optical device in which different lens frames are maintained to move coaxially.

2. Description of the Related Art

FIG. 1 is an exploded view of a conventional camera lens. FIG. 2 is a cross section of the conventional camera lens of FIG. 1. The camera lens 100 includes a first cam barrel 10, a first straight advance barrel 20, a first lens frame 30, a second cam barrel 40, a second straight advance barrel 50 and a second lens frame 60.

Three cam grooves 12 are formed on the first cam barrel 10, and three pins 14 are disposed on an outer periphery of the first cam barrel 10. Three straight grooves 22 are formed on the first straight advance barrel 20. The first lens frame 30 bears a first lens set (not shown) and has three pins 32 disposed on an outer periphery thereof. Teeth 42 are disposed on an outer periphery of the second cam barrel 40, so that the second cam barrel 40 can be rotated by a motor through a gear set (not shown) which engages the teeth 42. Cam grooves (not shown) and three straight grooves 44 are formed on an inner periphery of the second cam barrel 40. Three cam grooves 52 and three straight grooves 54 are formed on the second straight advance barrel 50. The second lens set 60 bears a second lens set (not shown) and has three pins 62 on an outer periphery thereof.

The second straight advance barrel 50 is disposed on a base (not shown) and within the second cam barrel 40 which is rotated by the motor through the gear set engaging the teeth 42. The second lens frame 60 is disposed within the second straight advance barrel 20, and the pins 62 of the second lens frame 60 extend through the straight grooves 54 of the second straight advance barrel 50 to engage the cam grooves (not shown) on the second cam barrel 40. The pins 14 of the first cam barrel 10 extend through the cam grooves 52 of the second straight advance barrel 50 to engage the straight grooves 44. The pins 32 of the first lens frame 30 extend through the straight grooves 22 of the first straight advance barrel 20 to engage the cam grooves 12 of the first cam barrel 10.

When the second cam barrel 40 is rotated by the motor and the gear set, the edges of the straight grooves 44 of the second cam barrel 40 push the pins 14 of the first cam barrel 10 to rotate the first cam barrel 10 so that the first lens frame 30, restrained by the straight grooves 22 of the straight advance barrel 20, is moved along a first axis L1. When the second cam barrel 40 rotates, the edges of the cam grooves (not shown) of the second cam barrel 40 push the pins 62 of the second lens frame 60. Thus, the second lens frame 60, constrained by the straight grooves 54 of the second straight advance barrel 50, is moved along a second axis L2.

In the described structure, the first lens frame 30 and the second lens frame 60 are required to move coaxially (i.e. the first axis L1 is coincident with the second axis L2, which can be accomplished by accurately manufacturing and fitting together the first lens frame 30, the first straight sleeve 20, the first cam barrel 10 and the second straight advance barrel 50. In practice, however, assembly of so many elements is liable to accumulated tolerance. As a possible result, the first axis L1 and the second axis L2 fail to coincide.

BRIEF SUMMARY OF THE INVENTION

The invention provides an optical device in which the lens frames are maintained to move coaxially. The optical device in accordance with an exemplary embodiment of the invention includes a first lens frame bearing a first lens set and having a plurality of rods, a first cam barrel rotating to move the first lens frame, wherein the first lens frame is moved parallel to a first axis, a second lens frame bearing a second lens set and having a plurality of holes corresponding to the rods, and a second cam barrel rotatably disposed around the first cam barrel to rotate the first cam barrel and move the second lens frame along a second axis parallel to the first axis, wherein the first axis is substantially coincident with the second axis with the rods inserted into the holes.

In another exemplary embodiment, an optical device includes a first lens frame bearing a first lens set and having a plurality of holes, a first cam barrel rotating to move the first lens frame, wherein the first lens frame is moved parallel to a first axis, a second lens frame bearing a second lens set and having a plurality of rods corresponding to the holes, and a second cam barrel rotatably disposed around the first cam barrel to rotate the first cam barrel and move the second lens frame along a second axis parallel to the first axis, wherein the first axis is substantially coincident with the second axis with the rods inserted into the holes.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
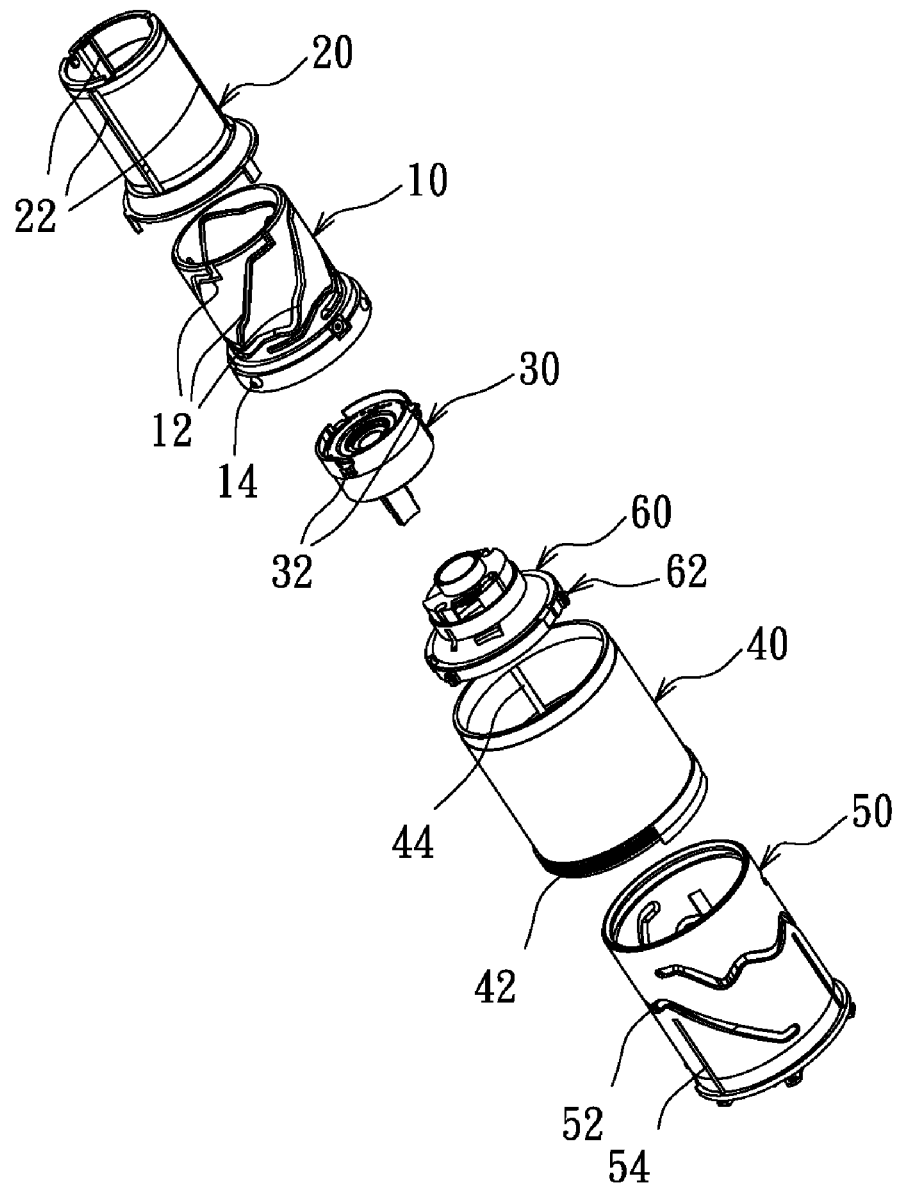
FIG. 1 is a perspective exploded view of a conventional camera lens.
Figure 2:
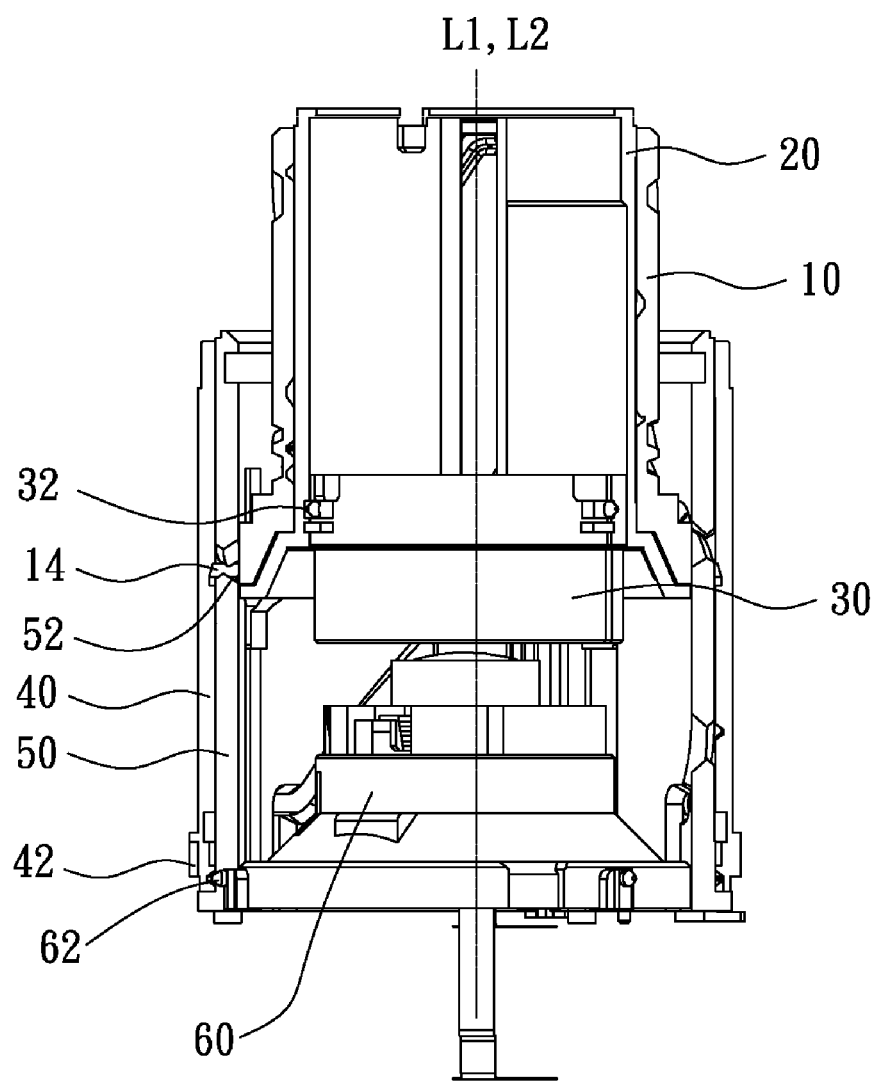
FIG. 2 is a cross section of the conventional camera lens of FIG. 1.
Figure 3:
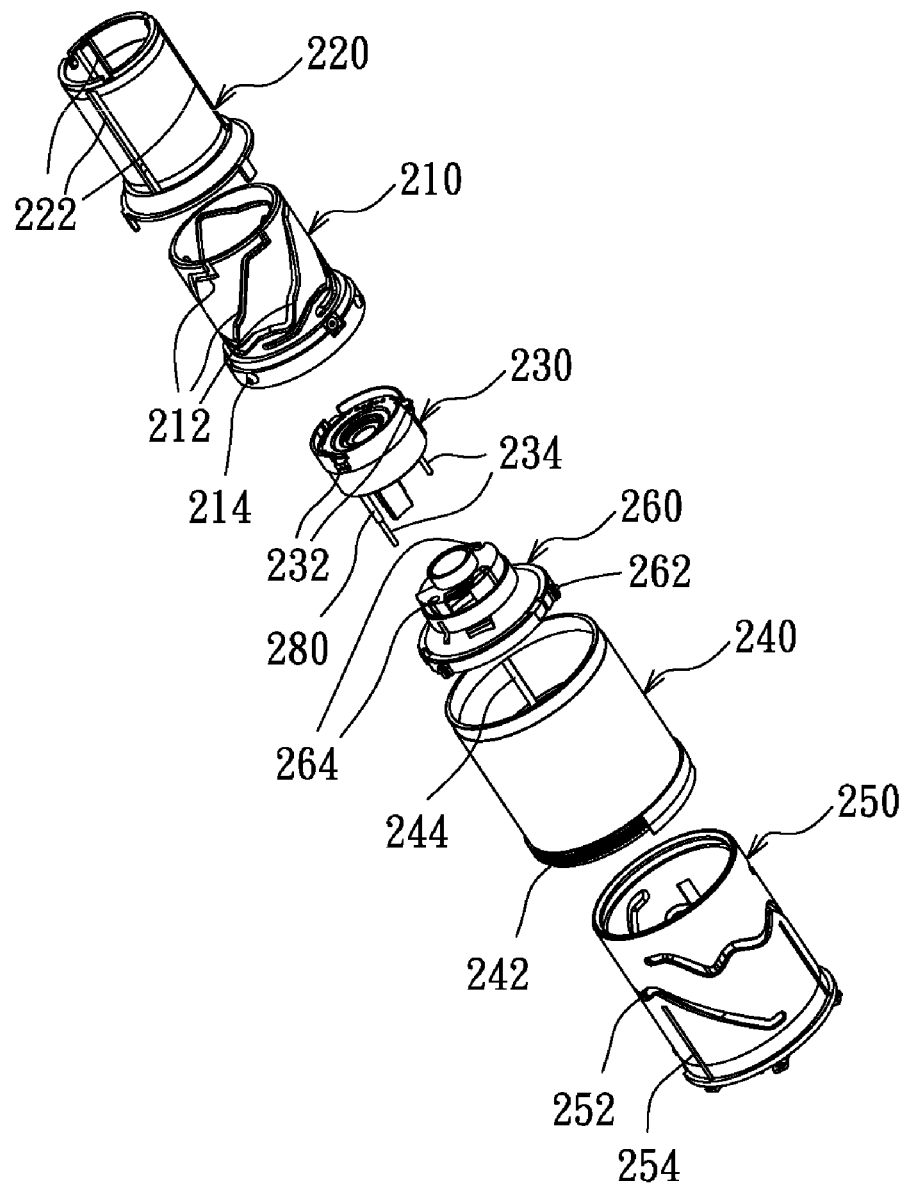
FIG. 3 is a perspective exploded view of an optical device of the invention.
Figure 4:
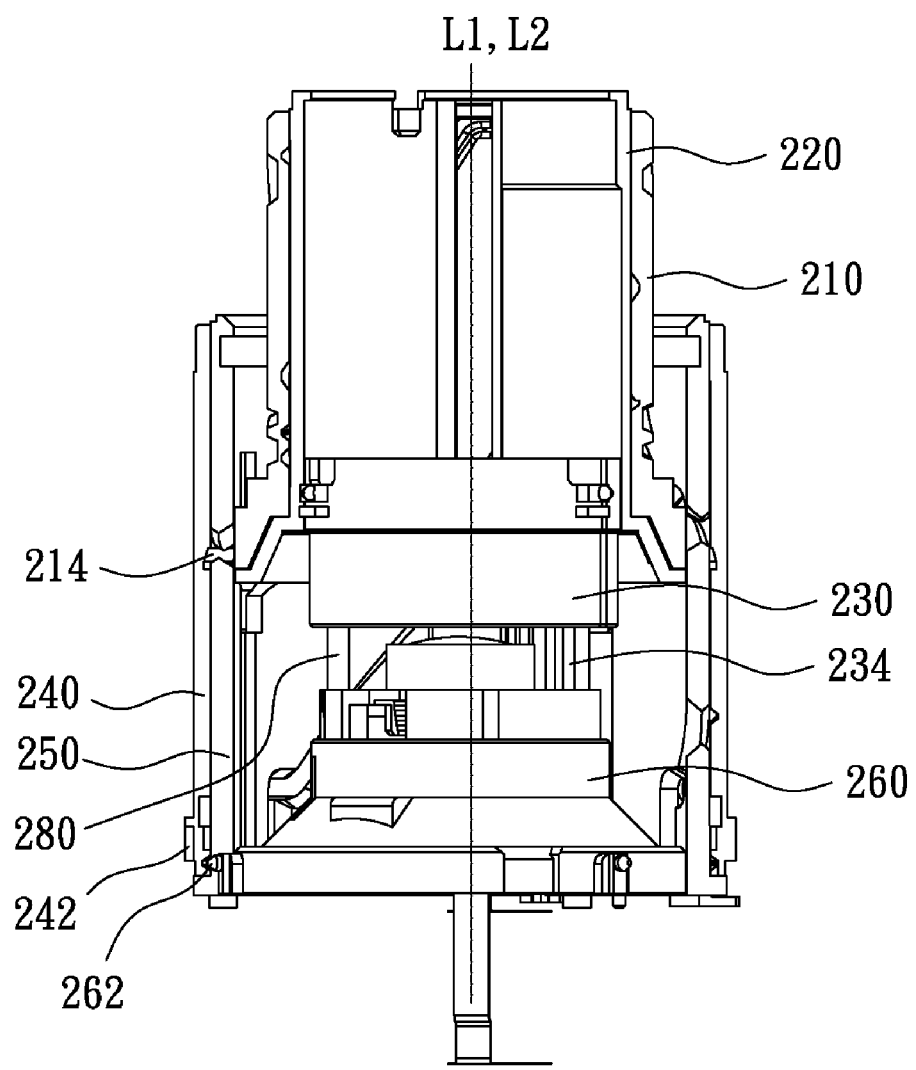
FIG. 4 is a cross section of the optical device of FIG. 3.

Referring to FIGS. 3 and 4, an optical device of the invention is described by a camera lens in this embodiment. A camera lens 200 includes a first cam barrel 210, a first straight advance barrel 220, a first lens frame 230, a second cam barrel 240, a second straight advance barrel 250 and a second lens frame 260.

Three cam grooves 212 are formed on the first cam barrel 210, and three pins 214 are disposed on an outer periphery of the first cam barrel 210. Three straight grooves 222 are formed on the first straight advance barrel 220. The first lens frame 230 bears a first lens set (not shown) and has three pins 232 on an outer periphery thereof and two rods 234 disposed on the end surfaces thereof. Teeth 242 are disposed on an outer periphery of the second cam barrel 240, so that the second cam barrel 240 can be rotated by a motor through a gear set (not shown) which engages the teeth 242. Cam grooves (not shown) and three straight grooves 244 are formed on an inner periphery of the second cam barrel 240. Three cam grooves 252 and three straight grooves 254 are formed on the second straight advance barrel 250. The second lens frame 260 bears a second lens set (not shown) and has three pins 262 on an outer periphery thereof and two holes 264 formed on the end surfaces thereof.

The second straight advance barrel 250 is disposed on a base (not shown) and within the second cam barrel 240 which is rotated by the motor through the gear set engaging the teeth 242. The second lens frame 260 is disposed within the second straight advance barrel 250, and the pins 262 of the second lens frame 260 extend through the straight grooves 254 of the second straight advance barrel 250 to engage the cam grooves (not shown) on the second cam barrel 240. The pins 214 of the first cam barrel 210 extend through the cam grooves 252 of the second straight advance barrel 250 to engage the straight grooves 244. The pins 232 of the first lens frame 230 extend through the straight grooves 222 of the first straight advance barrel 220 to engage the cam grooves 212 of the first cam barrel 210. The rods 234 of the first lens frame 230 are inserted into holes 264 of the second lens frame 260. A compression spring 280 is disposed on one of the rods 234 with two ends propped against the end surfaces of the first lens frame 230 and the second lens frame 260 respectively.

When the second cam barrel 240 is rotated by the motor and the gear set, the edges of the straight grooves 244 of the second cam barrel 240 push the pins 214 of the first cam barrel 210 to rotate the first cam barrel 210 so that the first lens frame 230, restrained by the straight grooves 222 of the first straight advance barrel 220, is moved along a first axis L1. When the second cam barrel 240 rotates, the edges of the cam grooves (not shown) of the second cam barrel 240 push the pins 262 of the second lens frame 260. Thus, the second lens frame 260, constrained by the straight grooves 254 of the second straight advance barrel 250, is moved along a second axis L2. By insertion of the rods 234 into the holes 264, the first axis L1 is coincident with the second axis L2, and the first lens frame 230 and the second lens frame 260 are coaxially moved. Compared with the prior art, the invention provides better structure to maintain the coaxial movement of the lens frames. The compression spring 280 is propped against the first lens frame 230 and the second lens frame 260 during movement to further ensure the coincidence of the first axis L1 and the second axis L2.

Although the rods 234 are disposed on the first lens frame 230 and the holes 264 are formed on the second 260, the invention is not limited thereto. It is also feasible that the rods are disposed on the second lens frame 260 and the holes are formed on the first lens frame 230.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
    a first lens frame bearing a first lens set and having a plurality of rods;
    a first cam barrel rotating to move the first lens frame, wherein the first lens frame is moved parallel to a first axis;
    a second lens frame bearing a second lens set and having a plurality of holes corresponding to the rods;
    a second cam barrel rotatably disposed around the first cam barrel to rotate the first cam barrel and move the second lens frame along a second axis parallel to the first axis, wherein the first axis is substantially coincident with the second axis with the rods inserted into the holes; and
    a second straight advance barrel disposed within the second cam barrel to restrain movement of the second lens frame along the first axis, wherein the first cam barrel is disposed within the second straight advance barrel.

2. The optical device as claimed in claim 1, wherein the first lens frame is disposed within the first cam barrel, and the second lens frame is disposed within the second cam barrel.

3. The optical device as claimed in claim 1, wherein the second cam barrel has teeth disposed on an outer periphery thereof, allowing a gear set which engages the teeth to rotate the second cam barrel.

4. The optical device as claimed in claim 1 further comprising a compression spring which is disposed on one of the rods and propped against the first lens frame and the second lens frame.

5. The optical device as claimed in claim 1 further comprising a first straight advance barrel disposed within the first cam barrel to restrain the first lens frame moving along the first axis.

6. An optical device comprising:
    a first lens frame bearing a first lens set and having a plurality of holes;
    a first cam barrel rotating to move the first lens frame, wherein the first lens frame is moved parallel to a first axis;
    a second lens frame bearing a second lens set and having a plurality of rods corresponding to the holes;
    a second cam barrel rotatably disposed around the first cam barrel to rotate the first cam barrel and move the second lens frame along a second axis parallel to the first axis, wherein the first axis is substantially coincident with the second axis with the rods inserted into the holes; and
    a second straight advance barrel disposed within the second cam barrel to restrain movement of the second lens frame along the first axis, wherein the first cam barrel is disposed within the second straight advance barrel.

7. The optical device as claimed in claim 6, wherein the first lens frame is disposed within the first cam barrel, and the second lens frame is disposed within the second cam barrel.

8. The optical device as claimed in claim 6, wherein the second cam barrel has teeth disposed on an outer periphery thereof, allowing a gear set which engages the teeth to rotate the second cam barrel.

9. The optical device as claimed in claim 6 further comprising a compression spring which is disposed on one of the rods and propped against the first lens frame and the second lens frame.

10. The optical device as claimed in claim 6 further comprising a first straight advance barrel disposed within the first cam barrel to restrain the first lens frame moving along the first axis.

* * * * *